Jan. 7, 1958   R. B. WHITE   2,818,606
MANUFACTURE OF ARTICLES FROM THERMOSETTING MATERIALS
Filed Oct. 27, 1952
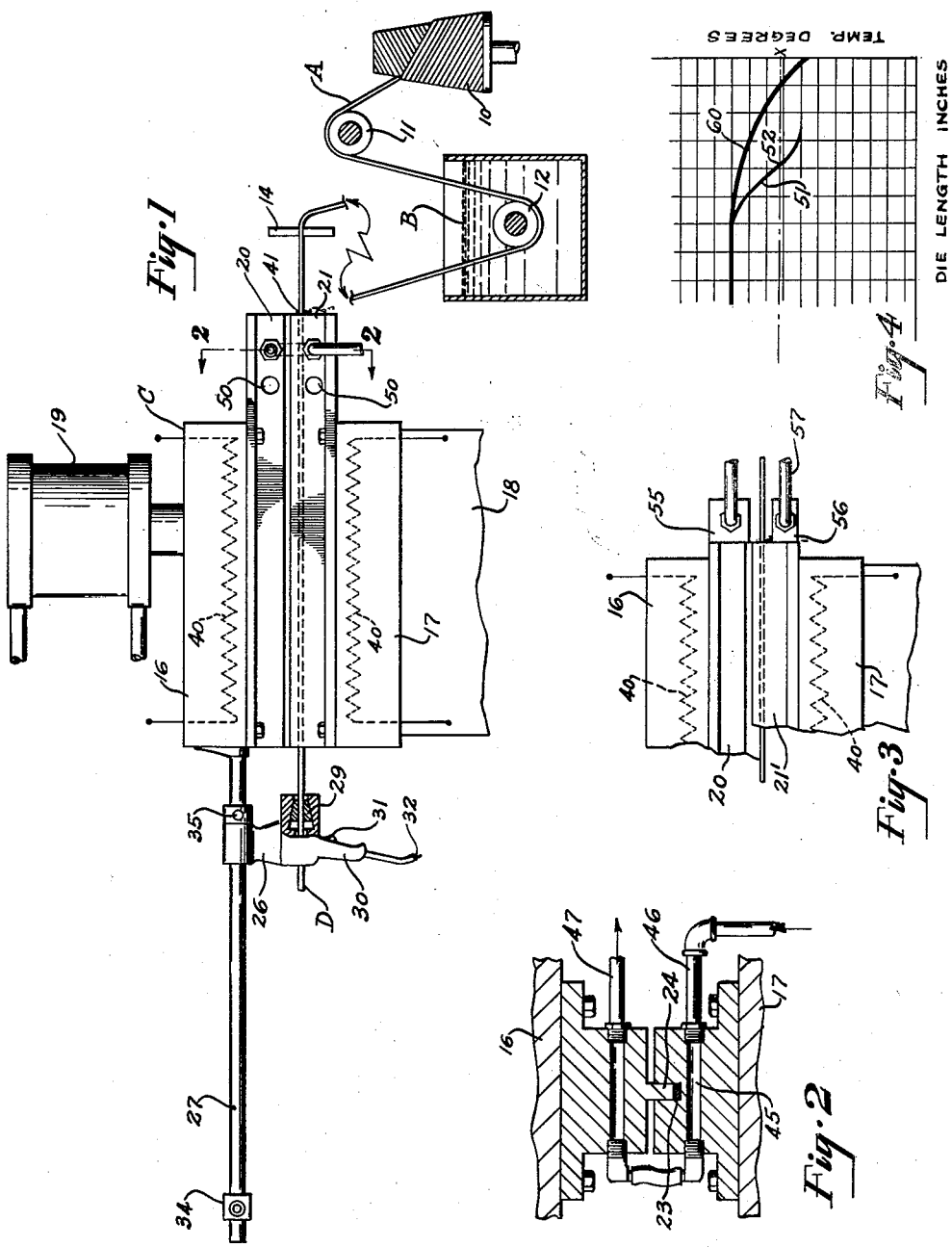
INVENTOR.
ROGER B. WHITE
BY Alfred G. Body

United States Patent Office 2,818,606
Patented Jan. 7, 1958

2,818,606

MANUFACTURE OF ARTICLES FROM THERMOSETTING MATERIALS

Roger B. White, Cleveland, Ohio, assignor to The Glastic Corporation, Cleveland, Ohio, a corporation of Ohio Application October 27, 1952, Serial No. 317,076

2 Claims. (Cl. 18—55)

This invention pertains to the art of molding thermosetting plastic materials and, more particularly, to a method for molding such materials having a dimension greater than the maximum dimension of the molds.

The invention is particularly adaptable to the molding of continuous lengths of glass-fiber-reinforced plastic strips wherein the plastic is of the thermosetting type and will be described with particular reference thereto, although it will be appreciated that the invention has broader applications such as applying to the manufacture of sheets, strips or otherwise and to using materials other than glass fiber as the reinforcing material such as cotton, silk, nylon, asbestos or the like.

Thermosetting plastic material has the characteristic that once it has been cured or set up by heating to or above a curing temperature, further heating will not further soften the material; that is to say, it is no longer plastic or deformable. This characteristic is very desirable for many applications but, when it is required to mold an article having a greater dimension than the maximum dimension of the molds to be employed, certain difficulties arise which the present invention attempts to overcome.

Normally, the fibrous material, such as glass fibers, is impregnated with a thermosetting plastic material having the characteristics desired for the final completed article and these impregnated fibers are clamped between heated mold members until the plastic material has cured or set. In this operation, the mold members are heated to a temperature sufficient to cause the curing action during the time-cycle of the molding apparatus. Normally, the mold is larger than the article to be molded and the article is completed in a single time cycle. However, the present invention contemplates making articles having a dimension which is greater than the maximum dimension of the molds so that two or more sequential molding operations on adjacent portions of the article are necessary to produce a completely molded article. Thus, the article is molded in sections by placing various uncured portions of the article between the molds until the plastic has cured and then advancing other portions between the molds and heating that portion. As the new uncured portions are advanced into the molds, some of the plastic is scraped onto the entrance end of the mold. Also, as the molds are brought together, some plastic is squeezed from between the molds, both of which actions tend to form a bead of plastic along the material at the entrance edge of the mold. It is this head which causes the difficulty. Heat from the molds tends to cause this bead to cure or set up to a sufficient amount such that it is incapable of being further molded or, if further molded, an inferior product results. Thus, as new portions of the uncured article are advanced into the mold, either all or part of this all or partly cured bead is advanced into the mold and the flaws just referred to result. Additionally, the bead, if it sets up sufficiently rigid, makes it impossible to advance new lengths of material into the mold. Various attempts have been made to eliminate the formation of the bead such as by very carefully controlling the amount of impregnating plastic on the fibrous material but, here, the difficulty is always present that insufficient impregnating plastic will be left in the fibrous material to fill the mold cavity and an inferior article will still result.

The present invention contemplates a method of molding which avoids all of the above-mentioned difficulties and enables the molding of articles impregnated with a thermosetting resin having any desired dimension greater than the dimension of the molds themselves.

In accordance with the present invention, heated mold blocks are provided having at least the edge thereof beyond which portions of the article to be molded project maintained at a temperature below that which will cause the material to set up or cure in the time interval required for the material between the mold blocks to cure or set up. Thus, the bead which is formed when the mold blocks are brought together remains in the plastic or uncured state and when subsequently moved to a position between the mold blocks, will be readily shaped thereby and a final resultant molded product will result in which there is no line or mark of demarcation or other flaws between portions molded at separate intervals. The end or edge of the mold blocks adjacent to where the uncured material or bead will be is preferably artificially cooled to the desired temperature below that of the mold blocks themselves and, in some instances, a heat barrier may be maintained between the main body of the mold blocks and remainder of the mold blocks. In other instances, the mold blocks may be formed with extensions of heat-insulating material such as to limit the transfer of heat from the mold blocks to the material at the edge of the block.

In accordance with the invention, heated mold blocks are provided having the edges thereof maintained at a temperature below that at which the thermosetting material will cure or set up in the time interval required for the molding operation and lengths of fibrous material impregnated with a thermosetting resin are advanced through the molds in intermittent steps, each of a length slightly less than the length of the mold blocks so that the bead or drop formed at the inlet edge of the mold blocks will be positioned between the heated portions of the mold blocks on the next step.

The invention may be comprised in certain steps and combinations of steps and parts and combinations of parts, preferred embodiments of which will be described in detail in this specification and illustrated in the accompanying drawing which is a part hereof, and wherein:

Figure 1 shows somewhat schematically a side elevational view partly in cross section of pressure-molding apparatus constructed in accordance with the present invention and also illustrating the method of molding long, continuous lengths of fibrous reinforced plastic strip as taught by the present invention;

Figure 2 is a cross-sectional view of Figure 1 taken approximately on the line 2—2 thereof;

Figure 3 is a fragmentary view somewhat similar to Figure 1 but illustrating a modified embodiment of the invention; and Figure 4 shows the temperature relationships generally necessary to be maintained in the molding apparatus according to the present invention.

Referring now to the drawings wherein the showings are for the purposes of illustrating the invention only and not for the purposes of limiting same, Figure 1 shows a long, continuous length of fibrous material A being advanced progressively through a plastic impregnating material B and, thence, through molding apparatus C from which it emerges as a rigid molded article of manufacture D.

The fibrous material A may be of any known material capable of imparting to the final molded plastic article the desired mechanical, electrical or other characteristics such as, without limitation, either short or long fibered glass, cotton, silk, asbestos, plastic or the like.

In some instances, wood fibers, paper or the like may be employed, here the purpose of the material being merely to serve as a vehicle for advancing plastic material into the molds, the plastic forming the main body of the molded article and the material contributing little to the characteristics of the end product.

In the preferred embodiment, the material A is comprised of many strands of long, small-diameter, flexible glass fibers coiled on one or more spools or spindles 10, from which spindles the material is advanced over a guide roller 11 and, thence, into the impregnating bath B where the material is held by means of a submerged guide roller 12.

The impregnating material of the bath B may be of any of the known plastic groups of the thermosetting type such as, but without limitation, the polyester group, the phenolics, the melamines or others, all depending upon the type of fibrous material A employed and the characteristics which it is desired that the final molded article D is to have. The invention does not exclude the thermoplastic; although, with such materials, some of the importance of the invention is lost. As is known, the thermosetting resinous materials have the characteristic that once they have been heated to above a curing or setting temperature and held at such temperature for a period of time, these materials lose their plastic or moldable characteristics and further heat and pressure are then unable to effect a further molding.

The material A now impregnated with the impregnating material B advances from the bath B through a scraper or wiper 14 which scrapes off any excessive impregnating material on the fibers A and allows it to drip back into the bath B and from the scraper 14, the impregnated fibers A advance in a generally horizontal direction into the molding apparatus C, although it will be appreciated that the passage through the molding apparatus C could be in other directions than the horizontal direction.

The molding apparatus C comprises upper and lower vertically aligned platens 16 and 17 respectively generally elongated in the direction the impregnated material A takes in passing through the apparatus C. The lower platen 17 is preferably fixedly mounted on the bed 18 of the apparatus C while the upper platen is movable in a vertical direction, a hydraulic ram 19 being shown for the purposes of moving the upper platen toward and away from the lower platen and placing the impregnated material A under pressure. Manual means or electrical means could also be employed in place of the hydraulic ram 19 shown.

The upper and lower platens 16, 17 respectively have mounted on their opposed surfaces upper and lower die blocks 20, 21 respectively and opening outwardly to both ends of the block. The upper mold block 20 is the male member and has a projecting portion 24 extending into the female cavity 23 over generally its entire length. The projections 24 and the cavity 23 have generally closely mating side surfaces and opposed surfaces shaped to conform to the desired final shape of the molded article D.

The upper and lower platens 16, 17 are heated in a manner as taught by the invention as will be presently described, which heat flows into the upper and lower die blocks by conduction to thus heat the impregnated material A in the mold cavity for the purposes of curing the resinous impregnating material and causing it to be set up hard.

The impregnated fibrous material A is advanced from right to left through the mold cavities by means of tension on the molded article D at the exit end of the die block, the hydraulic ram 19 being first released to draw the upper platen 16 away from the lower platen 17 a short distance so that the material in the cavity 23 can move freely. The tension may be applied to the molded article D in any desired way but, in the preferred embodiment, manual gripping apparatus is provided including a body member 26 slidably supported on a bar 27 mounted on the left or exit end of the platen 16 and extending horizontally outwardly therefrom in a direction generally aligned with the length of the mold cavity 23 through the die blocks 20, 21. The apparatus has a longitudinal opening therethrough aligned with the mold cavity 23 through which the molded material D extends and a pair of wedge members 29 slidably supported in the body 26 are wedged against the molded material D when a pull to the left is exerted on the body member 26 when the handle 30 is grasped manually and pulled toward the left. This handle 30 is equipped with a finger-operated switch 31 connected to valve, means not shown, through electrical wires 32 so that when it is desired to pull the molded article D through the molding apparatus C, the hydraulic ram 19 may be actuated to move the platens apart a sufficient distance to release the clamping pressure on the material in the mold and allow it to be freely moved. Stops 34, 35 fixedly adjustable on the slide bar 27 control the horizontal movement of the body member 26 and, thus, the amount of freshly impregnated fibrous material A which is drawn into the mold blocks for each molding operation.

As will appear, the spacing between these stops 34, 35 is somewhat important to the successful operation of the molding apparatus C and this adjustment will be subsequently described. It will be seen however, that by intermittently advancing lengths of the impregnated fibrous material A into the molding apparatus C, clamping the die blocks together and allowing the material to remain in this clamped position until the heat from the die blocks has had a sufficient time to cure the impregnating material B and then unclamping the die blocks and advancing additional lengths of impregnated fibrous material A into the mold cavity, continuous lengths of molded material D may be molded, the entire operation being generally described as an intermittent continuous molding process.

The time cycle; that is, the length of time in which the die blocks are held in clamping relationship with the impregnated material A or the time between which the material A may be advanced through the die blocks, will depend primarily on the curing characteristics of the impregnating material B which may vary between the various thermosetting resins or plastics employed and the temperature of the die blocks 20, 21. Normally, the die blocks 20, 21 must be heated to an elevated temperature. Any known means may be employed for heating these die blocks 20, 21 such as steam or the like but, in the embodiment shown, electrical heaters 40 are provided, one in each of the platens 16 and 17, to raise the temperature of the platens to any desired temperature such that heat flowing by conductivity into the die blocks will elevate the temperature thereof in the vicinity of the cavity 23 to a temperature which will cure the particular thermosetting resin B employed within the desired time cycle.

As will be noted from Figure 1, the impregnated material A at the point where it enters the mold cavity 23 has a small bead or droplet of impregnating material B formed thereon which may result from excessive impregnating material passing through the wiper 14 being scraped from the material A as it enters the mold cavity or may result from the liquid impregnating material B being squeezed out of the mold cavity when the die blocks are brought into pressure engagement. At any rate, if this material were also heated by the heat from the heaters 40 to a temperature above that at which curing will be effected within the time cycle of the press, such bead would lose its plastic characteristics and if it then were advanced into the mold cavity, would not mold properly and the finished strip material D would have defects in the length thereof.

All thermosetting resinous or plastic materials have a known or a determinable time-temperature curing relationship, that is to say, if the temperature of the material is increased beyond a certain critical temperature and held at this temperature for a required period of time, curing will take place either partially or completely such that the material loses the ability of being further successfully molded. This time-temperature relationship is one wherein the time required to effect the curing is normally inversely proportional to some function of the temperature or, stated alternatively, the temperature required to effect a curing action is inversely proportional to some function of the time during which the material will be at that temperature.

I have found that if the temperature of the impregnating material in the bead 41 can be kept below the temperature at which curing of the material in the bead 41 will occur within the time cycle of the molding apparatus, the above referred to difficulties can be avoided.

In accordance with the present invention, means are provided for reducing the temperature of or maintaining the temperature of the entrance end of the die blocks, i. e., of the cavity 23, below that temperature at which curing of the impregnating material in the bead 41 will take place within the required molding time for the material A in the mold cavity 23.

Thus, if it be assumed that the particular impregnating material employed will set up within the time cycle of the molding apparatus C at a temperature $x$ (see Figure 4), then the present invention contemplates maintaining the entrance end of the die blocks 20, 21 at some temperature below this temperature $x$.

Various means may be provided for maintaining this temperature relationship but, in accordance with the preferred embodiment of the invention, the right-hand end or entrance end of the die blocks 20, 21 extend beyond the right end of platens 16, 17 as shown and the extending portions have transverse passages 45 therethrough threaded at the ends to receive pipe fittings and a water-inlet hose 46 is connected to one end of the inlet passage 45 in the lower block 21 and a water-outlet hose 47 is connected to one end of the passage 45 on the upper block 20. The opposite ends of the passage 45 are interconnected by a flexible hose 48 so that water flowing into the hose 46 can pass through the lower passage 45, thence upwardly through the hose 48 to the upper passage 45 and thence out through the drainage hose 47. Water flowing through the passages 45 continuously removes heat from the blocks 20, 21 at a rate sufficiently rapidly to reduce the temperature of the right-hand end of the blocks 20, 21 to a value below the temperature $x$.

Heat barriers in the form of transverse passages 50 are provided in each block 20, 21 adjacent the water-cooling passages 45. These passages tend to reduce the amount of metal through which heat may be conducted and thus provide a steep temperature gradient in the die blocks 20, 21 similar to that shown by the curve 51 of Figure 4. It will thus be seen that all of the impregnating material B in the cavity 23 generally to the right of the heat barriers 50 will, at the end of a molding cycle, still be in the uncured state, including the material in the bead 41. Partial curing will take place along portions of the cavity length at the point 52 where the temperature line 51 crosses the temperature line $x$, but this partial curing takes place under pressure and when the molded article is withdrawn, it is pulled out only far enough so that the partially cured portions will remain in the cavity for the next molding operation.

The position of the stops 34, 35 is thus so adjusted on the slide bar 27 that when the mechanism for pulling new impregnated material A into the mold cavity is operated, the uncured portions of the impregnated material will still remain within the mold cavity; that is to say, the spacing between the adjustable stops 34, 35 is so adjusted as to be less than the mold distance between the left-hand end of the blocks and the point 52 where the temperature curve of the die blocks goes below the temperature $x$. In this way, a smooth, unbroken and flawless cured impregnated material may be obtained.

Figure 3 shows an alternative embodiment of the invention wherein the maximum length of the die blocks may be employed for the purpose of molding and curing the impregnating material B. In this embodiment of the invention, the entire length of the upper and lower platens 16, 17, respectively, are heated by the heating means 40 shown. Mounted on the entrance or right-hand end of the die blocks 20, 21, however, are copper blocks 55, 56, respectively, having water-cooling connections 57 connected thereto for the purpose of circulating cooling water through the blocks 55, 56 and withdrawing heat from the right or entrance side of the die blocks. With such an arrangement, it has been found that a temperature curve plotted against the length of the die similar to the curve 60 can be obtained, the important thing about the curve 60 being that its right-hand terminus is below the temperature $x$ such that any bead 41 formed on the entrance end of the die blocks 20′, 21′ will not cure within the time cycle of the molding apparatus.

It will also be seen that the curves 51 or 60 either cross the temperature line $x$ at a point interiorly of the mold cavity 23 which insures that any impregnating material B at the point of the cavity where the temperature does cross the temperature line $x$ will be held under molding pressure during the molding time and so that when new impregnated material A is advanced into the mold, this partially cured material can properly cure without the formation of any flaws or defects.

It will be noted that the mold cavity or recess 23 is open at both ends and that while only a narrow strip is shown as being molded, the width of the cavity 23 could be increased to any desired dimension such that fibrous reinforced plastic sheets of any desired length can be produced using the apparatus and the method of the present invention, irregardless of the length of the die blocks employed.

It will also be appreciated that fibrous reinforced plastic rods or bars of any cross-sectional shape, such as hexagonal or round, can be produced in continuous lengths, which rods or bars can also have transverse shoulders thereon. Even long continuous threaded bars, if desired, can be produced. Of course, with the production of such articles, the platens must be provided with a greater transverse movement such that the shoulders or the threads can be cleared each time it is desired to advance more impregnated uncured material into and between the mold blocks.

It will also be appreciated that sheets of fibrous impregnated plastic material having a dimension greater than both the length and width of the die blocks can also be produced, in which case, a flat open ended and open sided cavity would be provided and both one end and one side of the die blocks should have their temperatures reduced below the temperature X, the sheet then being selectively moved in two directions through the mold blocks until the entire sheet has been heated above the curing temperature for the time cycle of the impregnating material B. Obviously, with such a method, the upper and lower die blocks 20, 21 would have flat and parallel surfaces.

The invention is not limited to any one thermosetting material but is equally applicable to any plastic material which, when heated to some temperature for a given time, passes through a point where it is not freely moldable and is also applicable to the molding of such resinous materials where fibrous impregnating materials used for the purpose of reinforcement are not employed.

The invention has been particularly useful in the molding of long, continuous, narrow strips of glass reinforced plastic materials wherein plastics of the polyester group are employed but the invention is not so limited. Normally, several strips are advanced simultaneously through the die blocks using a plurality of die cavities.

The invention has been described and is particularly adapatable for use in the manufacture of glass fiber reinforced plastic articles. It will be appreciated, however, that the invention may be employed with other types of fibrous materials or the like such as wood fibers, paper or otherwise, where the purpose of the material is only to serve as a vehicle for advancing the plastic impregnating material into the molds, the plastic material itself forming the main body of the molded article and the fibrous material contributing little, if any, to the final characteristics of the end product. If desired, paper, either in single layers or bolted over, may be employed for this purpose. Obviously, the resultant article will not have the strength of a glass fiber impregnated plastic but, for many applications, the strength will be sufficient. In this event, the paper is simply an expedient or means for getting the plastic material to be molded into and between the mold blocks.

The invention has been described showing artificial cooling means at the entrance end of the mold blocks, the effect of which is to reduce the temperature of the entrance end of the mold to a point below the required temperature. Obviously, the molds may have extensions of material having a poor thermoconductivity such that the end of the material may be cooled sufficiently by radiation into the atmosphere as to lower its temperature below the required temperature. For this purpose, fibrous blocks may be employed; although, with such blocks which have a very poor heat conductivity, it will be appreciated that there will be a very sharp temperature change in a very short length of the modified mold blocks which, in some instances, might have an adverse effect on the final molded article. With the water-cooled metallic blocks as shown, there is a relatively longer distance on each side of the point where the temperature crosses the line $x$ so that there is a gradual change from the fully cured plastic material to the fully uncured plastic material, with the plastic material inbetween being in progressively different states of cure.

The scraper 14 has been shown only schematically. However, the dimension of the opening through which the fibrous material passes can, in some instances, be relatively critical. For example, if the dimension of the opening is too small, too much plastic material is scraped from the fibrous material and the molded article will not completely fill the mold cavity, thus resulting in an inferior product. It is preferred that the scraper 14 have an opening therethrough just sufficiently larger than that required so that there will be an excess of impregnating material to a slight amount. The ends of the mold can then serve as a further scraper and the bead of impregnating material which is scraped off will not cause any harmful effects. However, if the opening in the scraper is too large, then too much plastic material will enter the mold cavity and the resulting article will be somewhat oversized and, therefore, generally unsatisfactory.

In actual operation it has been found that as the material is advanced into the mold cavity each time, a small amount of impregnating material is scraped off but that, because of the temperature of the end of the mold blocks, this material will drip off of the end of the blocks and will cause no harm in any way to the final molded article.

Generally speaking, it may be said that the invention comprises the intermittent continuous molding of long, continuous strips of plastic material by intermittently advancing the material past intermittently clamped molds held at a temperature sufficient to cause the plastic material to cure or set up while maintaining at least the entrance end of the molds at a temperature insufficient to cause the material to set up during the time cycle between the advancement of the material through the clamped molds. The invention may also be said to comprise means for maintaining the mold blocks at the required temperature to cause the curing, together with means for maintaining the entrance end of the mold below the temperature required for the plastic material to cure within the time cycle desired.

As a means of illustrating the invention in order that those skilled in the art may subsequently practice same, only preferred embodiments of the invention have been described in detail in this specification. It will be obvious that modifications and alterations differing radically in appearance from those described herein will occur to those skilled in the art upon a reading and understanding of this specification and it is my intention to include all such modifications insofar as they come within the scope of the appended claims.

Having thus described my invention, I claim:

1. A method of manufacturing continuous lengths of a hardened thermosetting-plastic-impregnated-fiber rod in a mold cavity having a length less than that of the rod, comprising: providing a mold having an elongated mold cavity of a cross-sectional shape of the desired cross-sectional shape of the rod, such mold cavity having open entrant and exit ends, positioning a length of fiber impregnated with a thermosetting plastic material in said cavity and extending beyond both said ends, the plastic extending beyond the exit end being cured, the plastic extending beyond the entrant end being uncured, the cross-sectional area of the impregnated fibers extending beyond the entrant end being greater than that of the mold cavity such that portions of the plastic will be scraped or squeezed off onto the entrant end of the mold adjacent the cavity as impregnated fibers are pulled into the mold cavity, heating the surfaces of said mold cavity spaced from the entrant end thereof to a temperature above the curing temperature of said plastic in the desired time cycle of the molding operation, allowing the plastic-impregnated fibers to remain stationary for such time cycle and curing and then pulling the hardened plastic-impregnated fibers from the exit end of the cavity while simultaneously pulling in unhardened plastic-impregnated fiber into the entrant end, the act of pulling in the unhardened plastic into the entrant end scraping and squeezing off unhardened plastic onto the entrant end of said mold and continuously cooling the entrant end of said mold to a temperature below the partial curing temperature of the plastic so that the scraped or squeezed off plastic does not cure and will not be dragged into the mold cavity.

2. A method of manufacturing continuous lengths of a hardened thermosetting-plastic-impregnated-fiber rod in a mold cavity having a length less than that of the rod, comprising: providing a mold having an elongated mold cavity of a cross-sectional shape of the desired cross-sectional shape of the rod, such mold cavity having open entrant and exit ends, positioning a length of fiber impregnated with a thermosetting plastic material in said cavity and extending beyond both said ends, the plastic extending beyond the exit end being cured and the plastic extending beyond the entrant end being uncured, an outer cross-sectional dimension of the impregnated fibers extending beyond the entrant end being greater than that of the mold cavity whereby portions of the plastic will be scraped off onto the entrant end of the mold, adjacent the cavity as impregnated fibers are pulled into the mold cavity, heating the surfaces of said mold cavity spaced from the entrant end thereof to a temperature above the curing temperature of said plastic in the desired time cycle of the molding operation allowing the plastic-impregnated fibers in the heated portion of the mold cavity to remain stationary for such time cycle of curing and then pulling the hardened plastic impregnated fibers from the exit end of the cavity while simultaneously pulling in unhardened plastic-impregnated fiber into the entrant end, the act of pulling in the unhardened plastic into the entrant end scraping and squeezing off unhardened plastic onto the entrant end of said mold and continuously maintaining the entrant end of said mold at a temperature below the curing temperature of the plastic.

References Cited in the file of this patent

UNITED STATES PATENTS

| | | |
|---|---|---|
| 1,321,517 | Frederick | Nov. 11, 1919 |
| 2,210,000 | Peel | Aug. 6, 1940 |
| 2,327,566 | Slusher | Aug. 24, 1943 |
| 2,536,093 | Coleman | Jan. 2, 1951 |
| 2,602,188 | Gorecki | July 8, 1952 |